BEST AVAILABLE COPY

F. B. Hunt.
Straw-Cutter.

No. 2837 Reissued Jan. 14, 1868.

Witnesses.
Geo. L. Maus Ler
Chas. H. Smith

Inventor:
F. B. Hunt
per L. M. Sinell
Atty.

F. B. Hunt.

Straw-Cutter.

No. 2837 Reissued Jan. 14, 1868.

Witnesses.
Geo. D. Wauseli
Chas. H. Smith

Inventor.
F. B. Hunt
per L. W. Serrell
Atty.

F. B. Hunt.

Straw-Cutter.

No. 2837 Reissued Jan. 14, 1868.

Witnesses.

Chas. H. Smith

Geo. E. Muller

Inventor:

Franklin Benjamin Hunt

United States Patent Office.

FRANKLIN BENJAMIN HUNT, OF RICHMOND, INDIANA.

*Letters Patent No.* 41,070, *dated January* 5, 1864; *reissue No.* 2,368, *dated October* 2, 1866; *reissue No.* 2,837, *dated January* 14, 1868.

IMPROVEMENT IN STRAW-CUTTERS.

The Schedule referred to in these Letters Patent and making part of the same.

TO ALL WHOM IT MAY CONCERN:

Be it known that I, FRANKLIN BENJAMIN HUNT, of Richmond, in the county of Wayne, and State of Indiana, have invented certain new and useful Improvements in Machines for Cutting Straw and other substances; and I do hereby declare that the following is a full, clear, and exact description of the same, reference being had to the accompanying drawings, making a part of this specification, in which—

Figure 1:
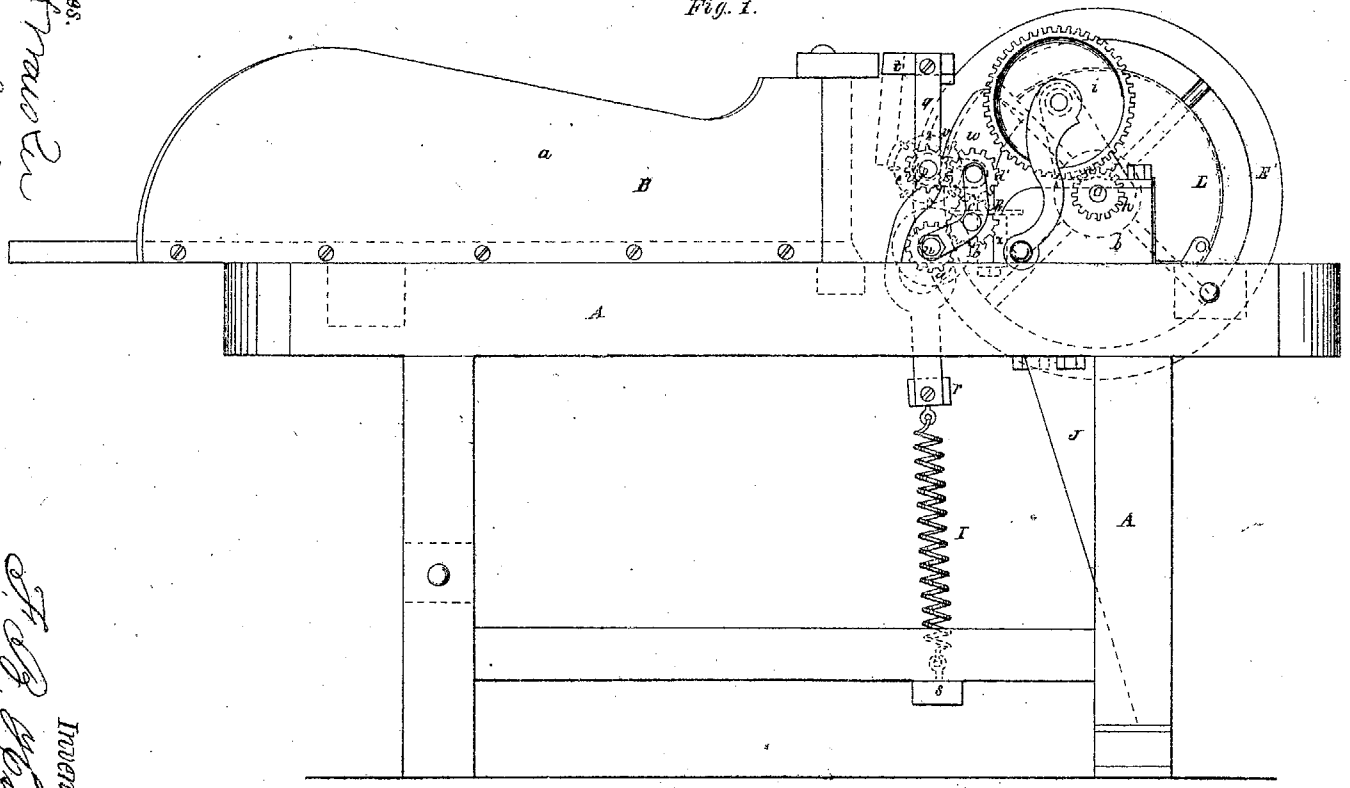

Figure 1 is a side view of my invention.

Figure 3:
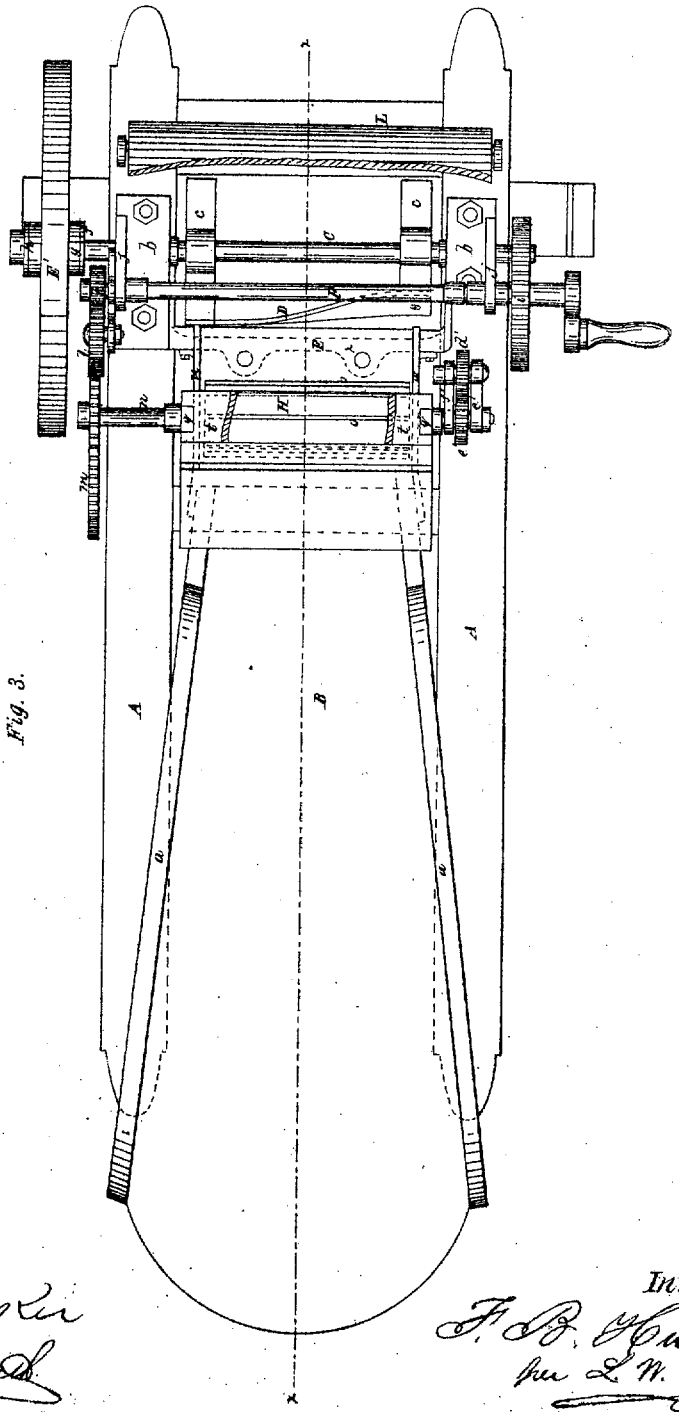
Figure 2:
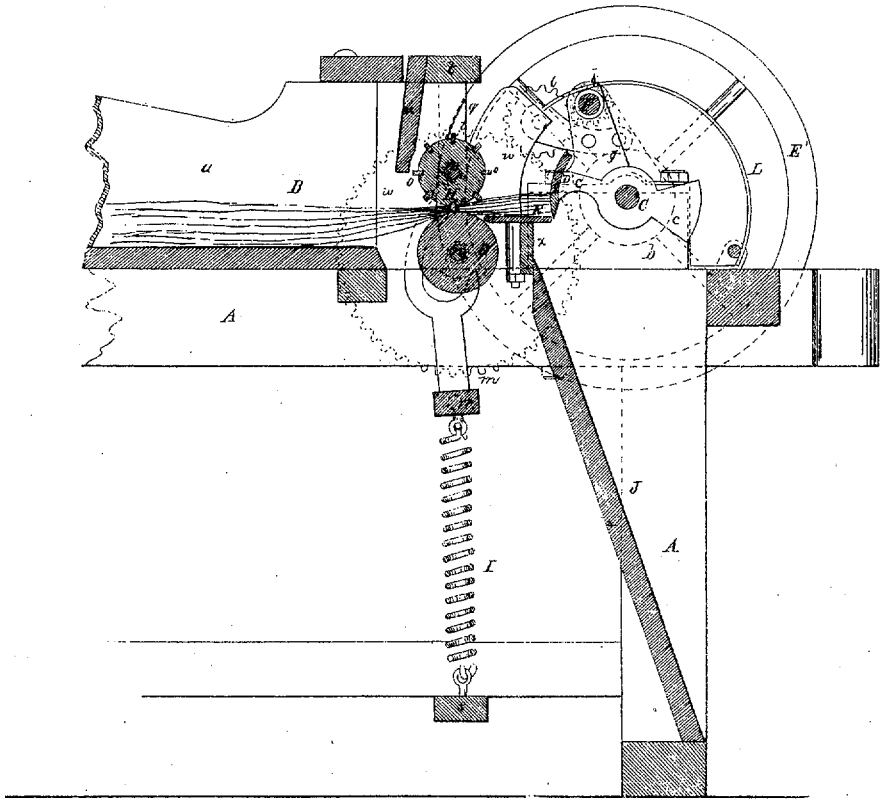

Figure 2, a vertical longitudinal section of the same at the line *x x*, fig. 3.

Figure 3, a plan or top view of the machine partly in section.

Figure 4:
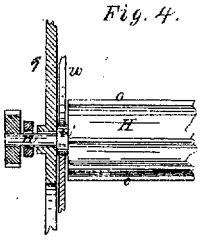

Figure 4, a detached front view of a portion of the upper feed-roller with one ot the bearings in section.

Figure 5:
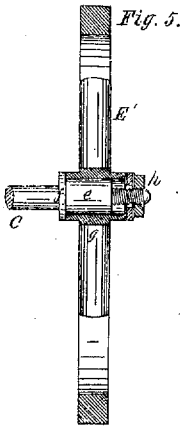

Figure 5, a detached central section of the fly-wheel fitted on its shaft.

Figure 6:
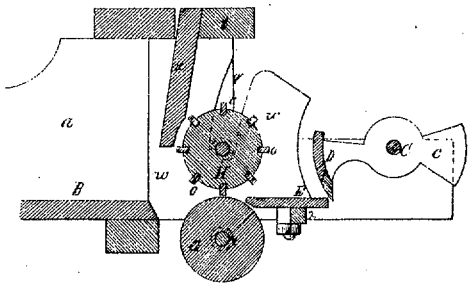

Figure 6, a detached view in the same plane as fig. 2, illustrating the manner of setting the axis of the knife above the plane of the cutter-bar in order to cut the fodder obliquely.

Similar letters of reference indicate corresponding parts in the several figures.

My invention relates to a new and improved machine for cutting fodder, such as hay, straw, cornstalks, &c., in a suitable manner for feed for horses and cattle. My machine is also adapted, by the peculiar construction and arrangement of its parts, to cutting up into short pieces hard roots, stems, and other substances, such as rope, woollen rags, &c., when such substances are required in short lengths to be treated by other machines or processes. I employ a curved knife set upon arms, and diagonal to its shaft, and acting upon the straw or other material that is fed along by a pair of rollers, to separate the same by a slanting and shearing cut, in consequence of the axis of the revolving knife being higher than the bar against which the knife cuts. This cutter-bar is adjustable horizontally, and is supported upon a bar cast in one piece with the journal-boxes of the cutter-shaft, so as to be very rigid and preserve the cutting portions in their proper relative positions.

In constructing my machine, I make a rigid bar, combined with the bearings of the cutter-shaft, and securely fasten it to the wooden frame A, thereby making a solid and firm foundation to work and construct upon and make a firm, solid, and durable machine. The fly-wheel and revolving cutting-knife are so connected to a shaft that when the cutting-knife is in rapid motion, and is brought in contact with a hard foreign substance, such as large sticks, &c., the revolving knife may be suddenly stopped and the fly-wheel allowed to continue to rotate and expend its momentum in a gradual manner, which is essential to the preservation of the knife and the other parts of the machine from injury by such sudden stoppage of the revolving knife.

The upper feed-roller is fitted in a frame provided with slings, that pass to a spring, or its equivalent, the said roller being free to accommodate itself to the thickness of material fed into the machine. Said roller is guided in its movements, as it rises and falls, by slots in guide-plates. Around the shaft of the adjustable feed-roller I place hubs to protect the shaft of the roller from friction and wear against the sides of the guide-slots in which it works. The frame to the adjustable feed-roller could be omitted and the roller simply attached to the slings, but I prefer combining the frame with the roller and slings, especially in large-sized machines. The slings to the adjustable feed-roll have hooks formed upon them, which catch against the bearings of the lower roll-shaft, the object of which is, that when one side has been raised to a much greater extent than the other, by the uneven material passing between the rolls, the hook on the raised side will check the further rising of that side, and tend to even the material in thickness as it is fed to the cutting-knife. Another feature of the hooks is that they prevent the adjustable feed-roll from an excessive quantity of material passing through to the action of the knife.

The cutter-bar, against which the revolving knife cuts, is adjustable, and is firmly supported by a rigid bar, thereby making a firm and solid support to hold the material to the cutting action of the knife. The horizontally moving adjustable bar is readily secured in proper position by screw-bolts or other appropriate means. The object of using a horizontally adjustable bar is that it is more easily adjusted to a revolving cutter than it would be to adjust the knife on its bearings to the bar, especially by an unskilled person.

I will now proceed to more particularly describe the parts of my machine (some of which are also novel and not hereinbefore described) by referring to the letters on the drawings.

In the drawing, A represents the framing of the machine, which may be constructed either of wood or metal, and in any proper manner to support the working parts. B is a feed-box, which is placed on the framing A, and may be of the usual taper form, its sides *a a* being nearer together at its discharge-end, as shown in fig. 3. On the front part of the framing A there are two bearings *b b*, in which a shaft, C, is fitted and allowed to rotate freely. This shaft C has two arms *c c* firmly keyed upon it, and to one end of each arm the cutter or knife D is secured by screws or otherwise. This cutter or knife occupies a diagonal or spiral position, and, as the shaft C is rotated, works closely over the outer edge of a horizontally adjustable bar, E, which is attached by screws or other suitable means, and having its bearing upon a metal bar, *x*, that is formed with and extends across from one bearing *b* to the other bearing *b*. The screw-holes in this bar *x* are elongated to admit of the cutter-bar E being adjusted further forward or backward, as desired, to compensate for wear either of the knife D or bar E. The screws or bolts *s'*, which hold the bar E down upon its bearings, are in a vertical position; therefore the holes in the bearings of the bar *x* may be elongated, or the screws may pass through elongated holes in the sliding bar E. The adjustable cutter-bar is made to extend through the side plates *w*, shown in fig. 3. The bar *x* being in one piece with the bearings *b*, holds the cutter-bar E in position much more reliably than is the case where screws or other connections intervene, which are liable to become misplaced or loosened in use. The weighted ends *c'' c''* of the arms *c c*, opposite to the cutter or knife D, are made sufficiently heavy to counterpoise or balance the cutter or knife on the shaft, and thereby insure a uniform and easy rotation and cutting action.

On one end of the shaft C a fly-wheel, E', is fitted. This shaft is shown with a collar, *e*, upon it, with a shoulder, *f*, at its inner end. The fly-wheel is fitted on this collar, the inner end of the hub *g* being pressed against the shoulder *f* by a nut, *h*, which is on a screw-cut on the shaft at the outer side of the collar *e*, and which bears against the outer end of the hub *g*, (see fig. 5.) By screwing up the nut *h* to a greater or less extent the hub *g* may be pressed more or less firmly against the shoulder *f*, and the fly-wheel secured to the shaft C more or less firmly, as desired, but not in any case so firm as to prevent the slipping of the wheel on its shaft when the cutter or knife is arrested in its motion by coming in contact with any hard foreign substance, such, for instance, as a thick stick, over-crowding of cornstalks, &c. By this slipping of the fly-wheel on its shaft the cutter or knife is greatly preserved, it being prevented from breaking and becoming nicked, strained, and bent under the action of the driving power in connection with the momentum of the fly-wheel. The collar *e* and shoulder *f* on the shaft C are not absolutely essential. The shaft C may be turned in slightly taper form, and the hub *g* of the fly-wheel fitted upon it more or less tightly by means of a screw-nut, and the same end attained. Other means may be resorted to to accomplish the same result, viz, to allow of the cutter-knife to be suddenly arrested and the fly-wheel to continue to revolve and expend its momentum in a gradual manner.

On the end of the shaft C, opposite to that where the fly-wheel E' is secured, there is fitted a pinion, *h'*, which gears into a wheel, *i*, on a shaft, *f*, above the shaft C, the bearings of the shaft F being in upright plates *j j* attached to the bearings *b b* of the shaft C. The shaft F has a pinion, *k*, upon it at the end opposite to that where the wheel *i* is attached, and this pinion *k* gears into a pinion, *l*, which gears into a wheel, *m*, on one end of the shaft *n* of a feed-roller, G, which is the lowest of a pair, and which shaft *n* works in fixed or unmovable bearings. The shaft F is the driving-shaft of the machine, and the shaft C, on which the cutter-arms *c c* are placed, is above the level or plane of the sliding adjustable cutter-bar E, as shown in fig. 2. This relative position of the shaft C and adjustable cutter-bar E causes the diagonal cutter or knife D to act or work with a drawing and shearing cut, and consequently with greater facility than it otherwise would.

H is the upper feed-roller, the periphery of which may be provided with longitudinal ribs, *o*, to catch and feed forward the substance in the feed-box B to be cut. The shaft *p* of this feed-roller H has its bearings in two slings *g g*, which are placed, one on each side of the feed-box B, and extend down below the same, and are connected at their lower ends by a cross-bar, *r*, to which a spiral spring, I, is attached, the lower end of said spring being connected to a cross-bar, *s*, at the lower part of the framing A. The upper ends of the slings *g g* are connected to a plate or board, *t*, to the back edge of which there is attached a pendent board or plate, *u*, which extends down back of the roller H, as shown in fig. 2.

The spring I is for the purpose of keeping the upper roller H pressed down toward the lower fixed roller G. Two cylindrical hubs *u'*, at the end of the roller H, pass into the curved slots *v v* in plates *w w* attached one to each side of the feed-box. The slots *v v* are parts of circles, of which the shaft C is the centre, and consequently when the roller H rises and falls, it moves in a circle concentric with C, and will, at all points of its movement, be at the same distance from C, and also have the same relative position with the cutter or knife D. This is a desirable feature in the invention, for if the roller H were allowed to move up and down in a vertical plane under the different thickness of the layer of straw or other substance beneath it to be cut, its distance would vary materially in relation with the cutter or knife, and be, when elevated, so far from the latter, that the straw or other material to be cut would not be held firmly in position. The substance to be cut is fed to the cutter or knife by the action of the two rollers G H. The hubs *u'* may be loose rings upon the shaft *p* or hubs projecting inward from the slings *q q*. In either case the shaft *p* is protected from friction and wear against the sides of the slots *v v*.

To admit of the aforesaid motion of the roller H, a peculiar gearing is necessary in order that said roller may be properly rotated while in any position. This gearing is arranged as follows: The shaft *n* of the lower feed-roller G has a pinion, *a'*, at its end, (opposite to that where the wheel *m* is attached,) and the pinion *a'* gears into a pinion, *b'*, the axis of which is a gudeon attached to a swinging plate, *c'*, the lower end of which plate *c'* is fitted loosely on the shaft *n*. The pinion *b'* gears into a similar pinion, *d'*, the axis of which is a gudgeon, also attached to the plate *c'*, and the pinion *d'* is kept in gear with a pinion, *e'*, on the shaft *p* of the upper roller H by means of a link, *f'*, which is attached to the gudgeon of the pinion *d'* at the upper end of the plate $c'$ and fitted loosely on the shaft $p$. By this arrangement the roller H is allowed to rise and fall without disconnecting the driving-gears. The board or plate $u$, which extends down back of the upper roller H, prevents the straw or other substance from passing over the top of said roller, a contingency which would be liable to occur were said board fixed or stationary, as it would necessarily require to be placed sufficiently high to admit of the thickest layers of straw or substance to be cut passing underneath it, and a thin layer would consequently be liable to pass over the roller H, the latter in that case being quite low, and the lower edge of the board $u$ quite high. My arrangement, it will be seen, completely obviates this difficulty, as the board $u$ moves up and down with the roller H.

L is a curb or cap, which covers the cutter or knife D, and J is a chute, which conducts the cut substance down at the front part of the machine. The substance to be cut may be cut into pieces of greater or less length by varying the relative size of the pinions $k$ $l$. More than one rotary knife may be placed upon the cutter-shaft, if required, but I prefer a single knife with a high speed, which will give a sharp, quick cut, which I believe to be more effective than a slow, tearing cut.

There are three prominently distinctive features in my machine, viz: By combining the bearings of the cutter-shaft with the rigid bar $x$, thereby making a solid foundation, to which all the working parts of the machine are combined; and, combining a horizontally sliding adjustable bar, against which a single revolving knife cuts with a rapid and quick cut; also, a frictional device, by which means the rapidly-revolving cutting-knife may be suddenly stopped when in rapid motion, and the fly-wheel allowed to continue to revolve and expend its momentum in a gradual manner.

Having thus described my invention, I claim as new, in machines for cutting straw, &c.—

1. I claim the bar $x$, cast in one piece, with the bearings $b$ $b$ of cutter-shaft $c$, and extending across from one to the other, substantially as shown.

2. I claim connecting the feed-rollers G and H by means of the pinions $a'$, $b'$, $d'$, and $e'$, the pinions $b'$ and $d'$ being placed on studs on the swinging plate $c'$, attached to the shaft $n$, the pinions $d'$ and $e'$ being kept in gear by the link $f$, or its equivalent.

3. I claim the swinging plate $c'$, connected to the shaft $n$, and carrying the pinions $b'$ and $d'$, substantially as and for the purpose shown and set forth.

4. I claim mounting the upper feed-roller H in a frame with sling extending below the lower feed-roller, and acted upon by a spring, or its equivalent, substantially as shown and for the purpose set forth.

5. I claim the hooked slings $q$ $q$, in combination with the yielding feed-roller H, and spring I, or its equivalent, whereby the said feed-roller H is limited in its upward movement, as set forth.

6. I claim the hubs or bearings $u'$ $u'$, attached to the slings $q$ $q$, and surrounding the shaft $p$ of the feed-roller H, said hubs moving in slots $b$ $b$ in plates $w$, and relieving the shaft from friction against the plates, as set forth.

7. I claim the guide-board or plate $u$, connected to and moving with the frame $t$ of the upper feed-roller H, and extending downward at the back of the said roller to near a level with its axis, substantially as and for the purpose set forth.

8. I claim the slots $v$ $v$ in the plates $w$, when made concentric with shaft C, in combination with pinions $a$, $b$, $d$, and $e$, said pinions connecting feed-rollers H and G, so that the adjustable roller can move up and down concentric with shaft C, and the pinions remain in gear, substantially as set forth.

9. In combination with the bar $x$ and adjustable bar E, I claim a revolving knife, D, with its axis placed above the plane of the adjustable cutter-bar E, to act with a slanting and shearing cut, substantially as set forth.

FRANKLIN BENJAMIN HUNT.

Witnesses:

N. W. HEILBORN,

P. M. POOL.